US011580223B2

(12) United States Patent
Morita et al.

(10) Patent No.: US 11,580,223 B2
(45) Date of Patent: Feb. 14, 2023

(54) VEHICULAR CONTROL APPARATUS

(71) Applicant: Hitachi Automotive Systems, Ltd., Hitachinaka (JP)

(72) Inventors: Nobuyoshi Morita, Tokyo (JP); Kota Ideguchi, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 455 days.

(21) Appl. No.: 16/755,465

(22) PCT Filed: Oct. 10, 2018

(86) PCT No.: PCT/JP2018/037701
§ 371 (c)(1),
(2) Date: Apr. 10, 2020

(87) PCT Pub. No.: WO2019/074000
PCT Pub. Date: Apr. 18, 2019

(65) Prior Publication Data
US 2020/0242247 A1 Jul. 30, 2020

(30) Foreign Application Priority Data
Oct. 13, 2017 (JP) .............................. JP2017-199331

(51) Int. Cl.
G06F 21/56 (2013.01)
B60R 16/023 (2006.01)
H04L 12/40 (2006.01)

(52) U.S. Cl.
CPC .......... *G06F 21/566* (2013.01); *B60R 16/023* (2013.01); *H04L 12/40* (2013.01);
(Continued)

(58) Field of Classification Search
CPC ...... G06F 21/566; G06F 21/755; G06F 21/78; G06F 21/86; B60R 16/023; B60R 25/00;
(Continued)

(56) References Cited

U.S. PATENT DOCUMENTS

2015/0172298 A1 6/2015 Otsuka
2017/0244594 A1 8/2017 Shiota et al.
(Continued)

FOREIGN PATENT DOCUMENTS

CN 105656693 A 6/2016
CN 105843206 A 8/2016
(Continued)

OTHER PUBLICATIONS

Hindi-language Office Action issued in Indian Application No. 202017015788 dated Mar. 26, 2021 with English translation (five (5) pages).
International Search Report (PCT/ISA/210) issued in PCT Application No. PCT/JP2018/037701 dated Nov. 20, 2018 with English translation (three (3) pages).
(Continued)

*Primary Examiner* — Matthew Smithers
*Assistant Examiner* — Shu Chun Gao
(74) *Attorney, Agent, or Firm* — Crowell & Moring LLP

(57) ABSTRACT

A vehicular control apparatus is used in an onboard system provided with a plurality of information processors mutually connected via a communication bus, and includes a storage section for storing information, and an arithmetic section for executing a process based on the information stored in the storage section. The information contains first management information relating to a security abnormality as a communication data abnormality owing to security attack from outside the onboard system, and second management information relating to a safety abnormality as a communication data abnormality owing to an abnormality in the onboard system. The first management information contains first limit condition information indicating a first limit condition for executing a security coping with the security abnormality. The second management information contains second limit condition information indicating a second limit con-
(Continued)

dition for executing a safety coping with the safety abnormality. Upon detection of the communication data abnormality in the onboard system, the arithmetic section determines a coping content to the detected communication data abnormality based on the first management information and the second management information.

10 Claims, 11 Drawing Sheets

(52) U.S. Cl.
CPC .............. *G06F 2221/034* (2013.01); *H04L 2012/40273* (2013.01)

(58) Field of Classification Search
CPC ..... B60R 2325/40; H04L 12/40; H04L 9/002; H04L 9/0891; H04L 9/0894; H04L 63/1416; H04L 63/123; H04L 63/1408; H04L 63/0227; H04L 67/12; H04W 12/10; H04W 12/128; H04W 12/009; H04W 4/44; H04W 12/106; H04W 4/70
See application file for complete search history.

(56) References Cited

U.S. PATENT DOCUMENTS

| | | | |
|---|---|---|---|
| 2017/0324557 A1 | 11/2017 | Morita et al. | |
| 2018/0144119 A1 | 5/2018 | Kishikawa et al. | |
| 2019/0141070 A1* | 5/2019 | Tsurumi | B60R 1/00 |
| 2020/0211301 A1* | 7/2020 | Zhang | H04L 63/065 |
| 2021/0226872 A1* | 7/2021 | Ujiie | H04W 12/61 |

FOREIGN PATENT DOCUMENTS

| | | | | |
|---|---|---|---|---|
| FR | 3025035 A1 * | 2/2016 | ......... | G05B 23/0264 |
| JP | 2015-114907 A | 6/2015 | | |
| JP | 2016-96419 A | 5/2016 | | |
| JP | 2017-50841 A | 3/2017 | | |
| JP | 2017-152762 A | 8/2017 | | |

OTHER PUBLICATIONS

Japanese-language Written Opinion (PCT/ISA/237) issued in PCT Application No. PCT/JP2018/037701 dated Nov. 20, 2018 (four (4) pages).

\* cited by examiner

FIG. 6A

LOG INFORMATION 29

| CAN ID FOR ABNORMAL STATE (601) | ABNORMAL STATE ID (602) | ABNORMALITY DEGREE (603) |
|---|---|---|
| 0x101 | 0x01 | 0x3 |

FIG. 6B

| CAN ID FOR ABNORMAL STATE (601) | ABNORMAL STATE ID (602) | MONITOR TYPE (604) | MONITOR RESULT (EACH MONITOR TYPE) (605) |
|---|---|---|---|
| 0x104 | 0x04 | IMPROPER CYCLE MESSAGE | 5 TIMES |

FIG. 7

SUSPICIOUSNESS CALCULATION INFORMATION 24

| VERIFICATION ID | VERIFIED CONTENT | SECURITY SUSPICIOUSNESS UP/DOWN | WEIGHTING VALUE |
|---|---|---|---|
| 1 | DETECTING MONITOR ITEM OF DEVICE AS ENTRY POINT | UP | LOW |
| 2 | SPREADING INFLUENCE ALONG EXPECTED ATTACK ROUTE (REVEALING ABNORMALITY) | UP | MIDDLE |
| 3 | INWARD TRANSITION OF DETECTION RANGE (RELAY, FINAL ATTACK SOURCE DEVICE) AFTER DETECTION AT ENTRY POINT | UP | HIGH |
| 4 | TAKING TIME TO SPREAD INFLUENCE | UP | LOW |
| 5 | MORE FREQUENT OCCURRENCE THAN FAILURE MODEL | UP | MIDDLE |
| 6 | NEW ABNORMALITY HAS NOT BEEN DETECTED IN A FIXED PERIOD | DOWN | LOW |
| 7 | DETECTING MONITOR ITEM OF DEVICE AS RELAY | UP | MIDDLE |
| 8 | DETECTING MONITOR IDTEM OF DEVICE AS FINAL ATTACK SOURCE DEVICE | UP | HIGH |
| 9 | DETECTING MONITOR ITEM OF DEVICE AS ATTACK TARGET | UP | HIGH |
| ... | ... | ... | ... |

FIG. 8

SAFETY ABNORMALITY VERIFICATION INFORMATION 28

| SAFETY ABNORMALITY ID | ABNORMALITY CONTENT |
|---|---|
| 0xA1 | FAILURE ALERT OF DEVICE |
| 0xA2 | COMMUNICATION NOISE |
| 0xA3 | UNEXPECTED POWER SUPPLY LOSS |
| 0xA4 | BUS-OFF OF DEVICE |
| 0xA5 | DISCONNECTION ALERT |
| 0xA6 | EXECUTE FUNCTION DEGENERATION |
| 0xA7 | CHANGE IN AUTOMATIC OPERATION MODE |
| ... | ... |

FIG. 9A

SAFETY COPING TIME INFORMATION 22

| SECURITY ABNORMALITY ID (SeAID) | ALLOWABLE COPING TIME | SECURITY COPING | PREDICTED COPING TIME |
|---|---|---|---|
| 0x01 | 80ms | Se COPING 01 | 60ms |
| 0x02 | 300ms | Se COPING 02 | 150ms |
| 0x03 | 1000ms | Se COPING 03 | 500ms |
| ... | ... | ... | ... |

FIG. 9B

SAFETY COPING TIME INFORMATION 26

| SECURITY ABNORMALITY ID (SeAID) | ALLOWABLE COPING TIME | SECURITY COPING | PREDICTED COPING TIME |
|---|---|---|---|
| 0xA1 | 100ms | Se COPING 01 | 10ms |
| 0xA2 | 50ms | Se COPING 02 | 30ms |
| 0xA3 | 200ms | Se COPING 03 | 100ms |
| ... | ... | ... | ... |

FIG. 10

PERFORMANCE REQUIREMENT INFORMATION 27

| SAFETY ABNORMALITY ID (901) | SAFETY COPING (SaCID) (902) | PERFORMANCE REQUIREMENT (903) | SECURITY FUNCTION TO BE CHANGED (904) | COPING RELATED DEVICE (905) |
|---|---|---|---|---|
| 0xA1 | TRANSITION TO FUNCTION DEGENERATION | NO COMMUNICATION DELAY | MAC DISABLING | {ECU1,ECU2} |
| | | | DISABLING ENCRYPTION PROCESSING | {ECU1,ECU2} |
| 0xA2 | REDUNDANT COMMUNICATION DATA | CPU LOAD SMALLER THAN 40% | MAC DISABLING | {ECU1,ECU2, ...} |
| | | | DISABLING FILTERING | ECU1 |
| 0xA3 | RESTART NOTICE | COMMUNICATION USAGE SMALLER THAN 30% | STOP SECURITY RELATED LOG COMMUNICATION | ALL ECU |
| ... | ... | ... | ... | ... |

FIG. 11

|  | ABNORMALITY IN SECURITY | NO ABNORMALITY IN SECURITY |
|---|---|---|
| ABNORMALITY IN SAFETY | PRIORITIZE SECURITY COPING: SECURITY COPING ⇒ SAFETY COPING | NO CHANGE IN SECURITY FUNCTION: ONLY SAFETY COPING |
| ABNORMALITY IN SAFETY | PRIORITIZE SAFETY COPING: SAFETY COPING ⇒ SECURITY COPING | CHANGE IN SECURITY FUNCTION: SAFETY COPING + CHANGE PART OF SECURITY FUNCTION |
| NO ABNORMALITY IN SAFETY | LOW TRAVELING CONTROL INFLUENCE DEGREE: ONLY SECURITY COPING | CONTINUOUS MONITORING |
| NO ABNORMALITY IN SAFETY | HIGH TRAVELING CONTROL INFLUENCE DEGREE: SECURITY COPING + SAFETY COPING | CONTINUOUS MONITORING |

VEHICULAR CONTROL APPARATUS

TECHNICAL FIELD

The present invention relates to a vehicular control apparatus.

BACKGROUND ART

In recent years, an onboard system installed in an automobile for carrying out various electronic control operations is linked to devices outside the automobile via a communication network, for example, internet, Bluetooth (registered trademark), wireless LAN and the like so that various services are delivered to the user. Correspondingly, compared with the generally employed onboard device with no communication function to the device outside the vehicle, it has become increasingly important for the recent onboard system to enhance strength against external security attack. Accompanying with increasing adoption of OSS (Open Source Software), and connectability to the smartphone that cannot guarantee security, and the information device for after-sales services, concern for the security attack with exploitation of the security vulnerability has been rising. In view of the background as described above, the technology that suppresses the influence of security attack when detecting abnormality owing to such attack in the onboard system has been increasingly demanded.

The above-described technology has been known as disclosed in a patent literature 1. The patent literature 1 discloses the technology as described below. That is, when the communication frame is received from the communication bus, and the reception interval of the communication frames with different IDs deviates from a predetermined allowable range, judgement is made whether or not the received communication frame is improper. Then the frame judged as being improper will be discarded.

CITATION LIST

Patent Literature

Patent Literature 1: Japanese Patent Application Laid-Open No. 2017-50841

SUMMARY OF INVENTION

Technical Problem

The communication data abnormality generated in the onboard system have two types, that is, those caused by the external security attack (injection of improper message, tampering of data and firmware and the like) (hereinafter referred to as "security abnormality"), and those caused by the abnormality that has occurred in the onboard system (disconnection, noise, failure and the like) (hereinafter referred to as "safety abnormality"). The technology as disclosed in the patent literature 1 is not intended to cope with the safety abnormality, but to the security abnormality only. The present invention has been made in consideration of the above-described problem, and it is an object of the present invention to provide the onboard system capable of coping with both the security abnormality and safety abnormality.

Solution to Problem

The vehicular control apparatus according to the present invention used in an onboard system having a plurality of information processors mutually connected via a communication bus includes a storage section for storing information, and an arithmetic section for executing the process based on the information stored in the storage section. The information contains first management information relating to a security abnormality as a communication data abnormality owing to security attack from outside the onboard system, and second management information relating to a safety abnormality as a communication data abnormality owing to an abnormality in the onboard system. The first management information contains first limit condition information indicating a first limit condition for executing a security coping with the security abnormality. The second management information contains second limit condition information indicating a second limit condition for executing a safety coping with the safety abnormality. If the communication data abnormality in the onboard system is detected, the arithmetic section determines a coping content to the detected communication data abnormality based on the first management information and the second management information.

Advantageous Effects of Invention

The present invention provides the onboard system capable of appropriately coping with both the security abnormality and the safety abnormality.

BRIEF DESCRIPTION OF DRAWINGS

FIGS. 6A and 6B are views showing an example of a log information data structure.

FIG. 7 is a view showing an example of a suspiciousness calculation information data structure.

FIG. 8 is a view showing an example of a safety abnormality verification information data structure.

FIGS. 9A and 9B are views showing each example of data structures of security coping time information and safety coping time information.

FIG. 10 is a view showing an example of a performance requirement information data structure.

FIG. 11 is a view showing an example of a judgement table.

DESCRIPTION OF EMBODIMENT

Figure 1:
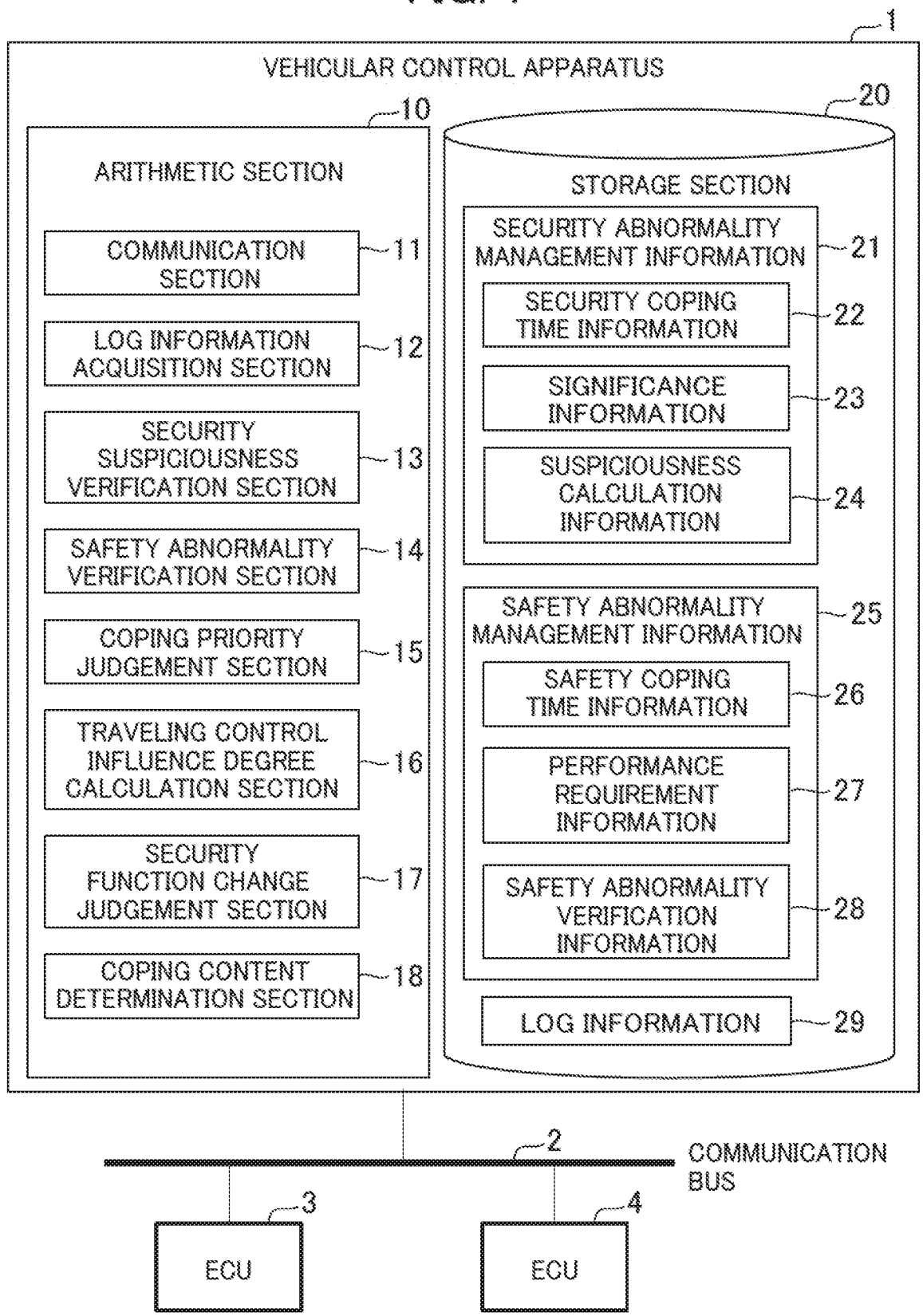
FIG. 1 is a view showing a structure of a vehicular control apparatus according to an embodiment of the present invention.

An embodiment of the present invention will be described in detail referring to the drawings.

Described hereinafter is an embodiment of a vehicular control apparatus used in an onboard system having a plurality of information processors mutually connected via a communication bus. If communication data abnormality occurs in the onboard system, the vehicular control apparatus collects information for judgement on the state from the respective information processors in the onboard system, and specifies whether or not the security abnormality and the safety abnormality have occurred, respectively. The coping contents to be executed to the abnormality is determined so that the respective information processors are notified of the determined coping contents.

It is preferable to utilize the safe communication channel supported by a known encryption technology for communication among the respective devices, and communication to the device outside the vehicle in the case of the onboard system to be provided with the vehicular control apparatus of the embodiment. In the above-described case, the key and the seed for encryption to be used in the respective devices may be distributed, managed, and updated safely through an arbitrary method. The above-described distribution and updating may be carried out at an arbitrary timing such as start-up and stopping of a vehicle engine, development of the product, and the maintenance work.

FIG. 1 is a view showing a structure of a vehicular control apparatus according to an embodiment of the present invention. A vehicular control apparatus 1 as shown in FIG. 1 is connected to ECUs (Electronic Control Unit) 3, 4 via a communication bus 2. The ECUs 3, 4 to be installed in the vehicle serve as information processors for executing various control and arithmetic operations. Although FIG. 1 only shows two ECUs 3, 4, actually, many ECUs are mutually connected via the communication bus 2.

The communication bus 2 is the communication channel installed in the vehicle utilizing, for example, CAN (Controller Area Network), LIN (Local Interconnect Network), FlexRay (registered trademark), Ethernet (registered trademark) and the like. The communication bus 2 may be physically constituted by a plurality of communication buses. In such a case, each standard for all the communication buses may be the same as or different from one another. The vehicular control apparatus 1 and the ECUs 3, 4 are installed in the vehicle while being mutually connected via the communication bus 2 to constitute the onboard system according to the present invention.

The vehicular control apparatus 1 includes an arithmetic section 10 and a storage section 20. The arithmetic section 10 is constituted by not shown CPU, ROM, RAM and the like. The CPU executes the program stored in the ROM through expansion to the RAM so that the following functions are implemented. That is, the arithmetic section 10 includes such functions as a communication section 11, a log information acquisition section 12, a security suspiciousness verification section 13, a safety abnormality verification section 14, a coping priority judgement section 15, a traveling control influence degree calculation section 16, a security function change judgement section 17, and a coping content determination section 18.

The communication section 11 serving as a communication interface with the communication bus 2 executes the arithmetic operation required for communication via the communication bus 2. The communication section 11 receives communication messages transmitted from the ECUs 3, 4 via the communication bus 2, and transmits the communication message to the ECUs 3, 4 via the communication bus 2. As described above, if a plurality of communication buses constitute the communication bus 2, the communication section 11 includes connection ports by the same number as that of the communication buses 2. The communication section 11 may be formed individually from the arithmetic section 10.

Based on the communication message received by the communication section 11 from the ECUs 3, 4, the log information acquisition section 12 acquires log information indicating the abnormality occurrence in the communication data of the onboard system, and stores the log information in the storage section 20.

The security suspiciousness verification section 13 acquires the security suspiciousness indicating the suspiciousness of the security abnormality based on the log information acquired by the log information acquisition section 12. The acquired security suspiciousness is verified to judge whether or not the external security attack against the onboard system exists.

Based on the log information acquired by the log information acquisition section 12, the safety abnormality verification section 14 verifies whether or not the safety abnormality exists.

If both the security abnormality and the safety abnormality are detected, the coping priority judgement section 15 judges which of the security coping for coping with the security abnormality and the safety coping for coping with the safety abnormality is executed in preference to the other. The security coping includes logging, log notification, message discarding, enhancement of security function, and prevention of propagation and the like, for example. Meanwhile, the safety coping includes degeneration of the control function, change in automatic operation level, message discarding and the like, for example.

If the security abnormality is detected, the traveling control influence degree calculation section 16 calculates the traveling control influence degree in accordance with the security abnormality. The traveling control influence degree that represents the severity level of influence of the security abnormality on the vehicular traveling control, and is utilized by the coping content determination section 18 for determining the security coping contents.

If the safety abnormality is detected, the security function change judgement section 17 judges whether or not it is necessary to change the security function of the onboard system upon execution of the safety coping for coping with the safety abnormality. The onboard system includes the security function for the communication data, for example, the message authentication function for securing safety of the communication message using MAC (Message Authentication Code) as the authentication code for notifying tampering, the encryption processing function for encrypting the communication message, and the filtering function to the communication message. In accordance with the processing load condition of the onboard system, the security function change judgement section 17 judges whether or not it is necessary to degenerate or disable a part of those security functions.

Based on at least one of the judgement result of the coping priority judgement section 15, the traveling control influence degree calculated by the traveling control influence degree calculation section 16, and the judgement result of the security function change judgement section 17, the coping content determination section 18 determines the coping content to the abnormality that has occurred in the communication data in the onboard system. The coping content determined by the coping content determination section 18 is notified to the ECUs 3, 4 via the communication section 11 as necessary.

The storage section 20 is a nonvolatile storage device. The storage section 20 stores security abnormality management information 21 as management information relating to the security abnormality, safety abnormality management information 25 as the management information relating to the safety abnormality, and log information 29. The information besides the above-described information, for example, the program to be executed by the CPU of the arithmetic section 10 may be stored in the storage section 20 partially or entirely.

The security abnormality management information 21 contains security coping time information 22 indicating time information relating to the security coping, significance information 23 indicating each significance of the ECUs 3, 4, and suspiciousness calculation information 24 which defines the rule for the security suspiciousness verification section 13 to calculate the security suspiciousness. The above-described information will be described later in detail.

The safety abnormality management information 25 contains safety coping time information 26 indicating time information relating to the safety coping, performance requirement information 27 that defines performance of the onboard system required for the safety coping, and safety abnormality verification information 28 used by the safety abnormality verification section 14 to verify the safety abnormality. Details of the information as described above will be described later.

The log information 29 is stored by the log information acquisition section 12. That is, the log information acquisition section 12 stores the log information indicating communication data abnormality occurrence in the onboard system in the storage section 20 as the log information 29.

Figure 2:
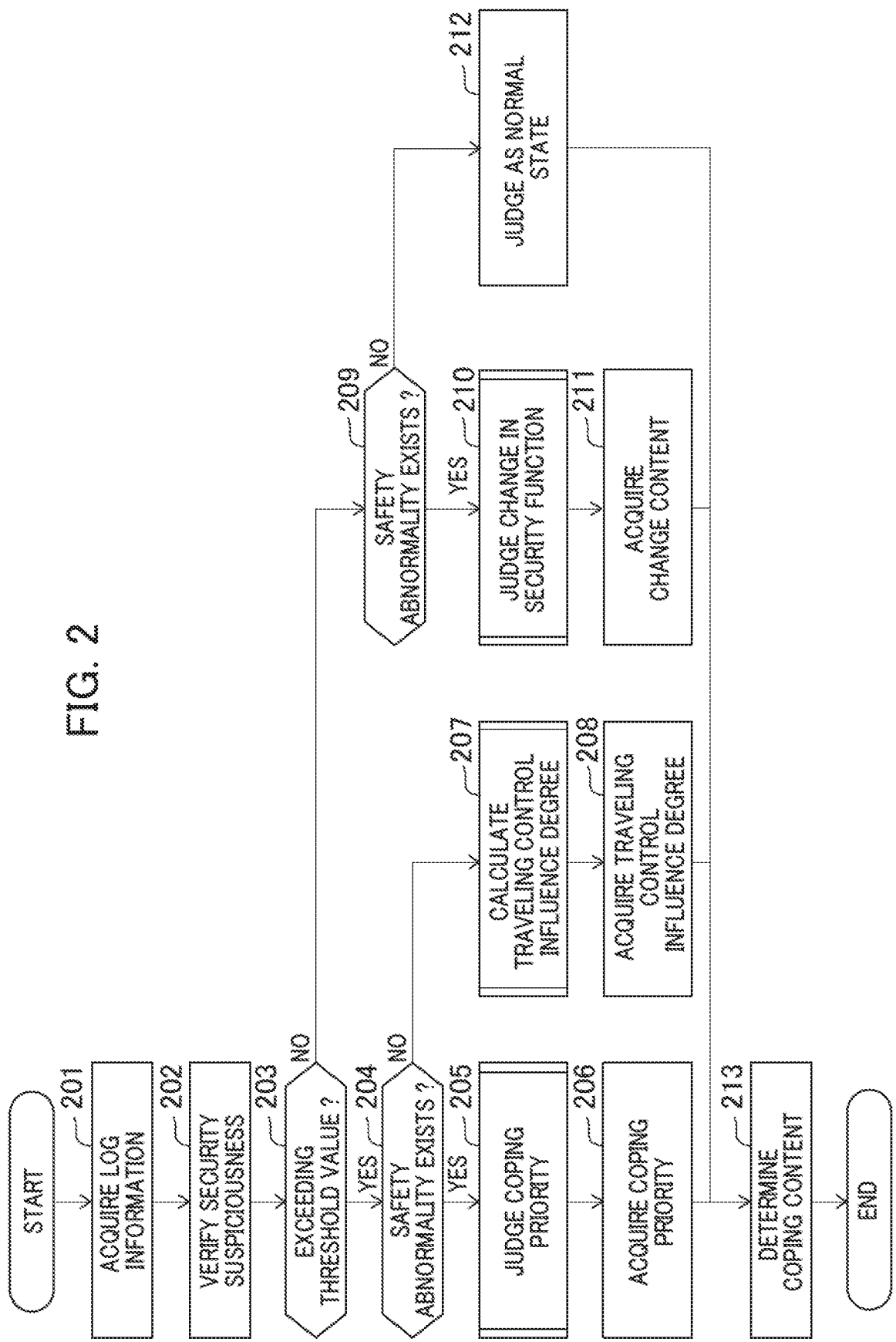
FIG. 2 is a flowchart representing a process flow executed in the vehicular control apparatus according to the embodiment of the present invention.

The process to be executed when the vehicular control apparatus 1 determines the coping content to the communication data abnormality will be described. FIG. 2 is a flowchart representing a process flow executed in the vehicular control apparatus 1 according to the embodiment of the present invention. The description will be made on the assumption that the respective steps are executed by the CPU of the arithmetic section 10.

In step 201, the log information acquisition section 12 allows the communication section 11 to acquire the communication message indicating the communication data abnormality occurrence in the onboard system among those transmitted from the ECUs 3, 4 so that the message is stored in the storage section 20 as the log information 29. Process step 202 and subsequent steps will be executed using the log information 29. The log information acquisition section 12 may execute the process in step 202 and subsequent steps for each acquisition of the log information 29. Alternatively, a plurality of pieces of the log information 29 collected by the log information acquisition section 12 within a predetermined period may be collectively processed in step 202 and subsequent steps. The log information acquisition section 12 may acquire the log information 29 based on the information other than the communication message to be transmitted/ received via the communication bus 2, for example, the information transmitted from the center server via internet.

FIG. 6 is a view showing an example of a data structure of the log information 29 acquired by the log information acquisition section 12. FIG. 6(*a*) shows an example of the log information 29 acquired in the case where the ECU with a communication data abnormality monitoring function is allowed to judge the influence degree upon the abnormality occurrence based on the communication message transmitted from such ECU. The log information 29 contains an abnormal state CAN ID 601 indicating an abnormality occurrence location, an abnormal state ID 602 indicating the type of the abnormal state, and an abnormality degree 603 indicating the abnormality influence degree.

The abnormal state CAN ID 601 has, for example, a unique ID number preliminarily allocated to the ECU as a transmission source of the communication message, for example. In order to allow easy identification of the abnormality occurrence in the communication data from the communication message, an ID number different from the CAN ID contained in the normal communication message may be allocated to the abnormal state CAN ID 601.

The abnormal state ID 602 has an ID number preliminarily allocated in accordance with the content (type) of the abnormal state. In order to allow easy identification whether the detected communication data abnormality corresponds to the security abnormality or the safety abnormality, it is preferable to manage the ID number set to the abnormal state ID 602 if the abnormality corresponds to the security abnormality, and the ID number set to the abnormal state ID 602 if the abnormality corresponds to the safety abnormality distinguishingly. The embodiment will be described on the assumption that the ID number has values "0x01" to "0x9F" allocated to the abnormal state ID 602 of the log information 29 corresponding to the security abnormality, and the ID number has values "0xA1" to "0xFF" allocated to the abnormal state ID 602 of the log information 29 corresponding to the safety abnormality.

A numerical value in accordance with the influence degree of the detected communication data abnormality on the vehicle operation is set to the abnormality degree 603. For example, as the abnormality influence degree becomes higher, the abnormality makes it difficult to normally operate the vehicle. As the possibility of endangering the occupant and periphery of the vehicle becomes higher, the larger value is set to the abnormality degree 603.

FIG. 6(*b*) shows an example of the log information 29 acquired based on the communication message transmitted from the ECU only with the communication data abnormality monitor function. The log information 29 contains the abnormal state CAN ID 601 and the abnormal state ID 602, which are similar to those shown in FIG. 6(*a*), a monitor type 604 indicating the abnormality content, and a monitor result 605 for each monitor type.

The monitor type 604 stores the information indicating specific content of the detected communication data abnormality. The content of the communication data abnormality indicated by the information includes, for example, detection of a communication message at improper cycle, authentication failure, increase in communication traffic volume, resource consumption condition of the CPU and the memory and the like. A preliminarily allocated ID number or the like for each of the communication data abnormality contents may be set to the monitor type 604.

The monitor result 605 stores the information in accordance with the communication data abnormality content indicated by the monitor type 604. For example, the monitor result 605 stores such data as the number of abnormality occurrences, and the number of cases where the resource consumption amount exceeds a preset threshold value owing to abnormality. The communication data indicating the abnormal state may be directly set to the monitor result 605.

The log information 29 as shown in FIG. 6 is an exemplified case, and may contain any other information. For example, additional information such as MAC contained in the communication message, the communication counter, and the time information may be contained in the log information 29.

Returning back to the description referring to FIG. 2, in step 202, the security suspiciousness verification section 13 verifies the security suspiciousness indicating suspiciousness of the security abnormality. The security suspiciousness verification section 13 calculates or acquires the security suspiciousness based on the log information 29 acquired by the log information acquisition section 12 in step 201. For example, if the log information 29 that contains the abnormality degree 603 indicating the abnormality influence degree is acquired likewise the log information 29 as exemplified in FIG. 6(*a*), the security suspiciousness verification section 13 acquires the value of the abnormality degree 603 as the security suspiciousness. That is, in the above-described case, the security suspiciousness verification section 13 is capable of acquiring the security suspiciousness from the ECU that has transmitted the communication message as the source of the log information 29. Meanwhile, if the log information 29 does not contain the abnormality degree 603 likewise the log information 29 as exemplified in FIG. 6(*b*), the security suspiciousness verification section 13 calculates the security suspiciousness from the log information 29 using the suspiciousness calculation information 24 contained in the security abnormality management information 21 that is stored in the storage section 20.

FIG. 7 is a view showing an example of a data structure of the suspiciousness calculation information 24 used by the security suspiciousness verification section 13 for calculating the security suspiciousness. The suspiciousness calculation information 24 as shown in FIG. 7 contains a verification ID 701 allocated to each record, a verified content 702 indicating a verification condition for calculating the security suspiciousness, a security suspiciousness Up/Down 703 indicating increase/decrease in the degree of security suspiciousness for each record, and a weighting value 704 indicating the degree of increase/decrease value with respect to the security suspiciousness for each record.

In the case of the record having the verification ID 701 set to the value "1", the verified content 702 is defined to verify whether or not the abnormality has been detected in an entry point directly linked to the outside of the vehicle, for example, the information processor. If the log information acquisition section 12 acquires the log information 29 that contains detection of abnormality in the ECU as the entry point, the security suspiciousness verification section 13 increases the security suspiciousness value in accordance with the value of the security suspiciousness Up/Down 703 of the corresponding record. In this case, the degree of increase in the value of the security suspiciousness is determined in accordance with the weighting value 704. For example, as the value of the weighting value 704 set to the record corresponds to "low", 1 is added to the security suspiciousness value. Likewise, for example, if the value set to the weighting value 704 corresponds to "middle", 3 is added. If the value set to the weighting value 704 corresponds to "high", 5 is added. The verified content 702 may include the verified content in various stages with which the respective ECUs are associated, for example, one or more stages in the course of attack, including an "entry point" such as the information processor directly connected to the outside of the vehicle, the "relay device" that intervenes in the path from the entry point to the attack target device, the "final attack source device" enabled to attack the attack target device via the relay device and the "attack target device", and may further include the verified content in accordance with the course of the attack in transition from one stage to another. The verified content may be selected in accordance with the detected location (where abnormality occurs) and the detected content.

The suspiciousness calculation information 24 as shown in FIG. 7 is an exemplified case, and may contain any other information.

The method of calculating the security suspiciousness is not limited to the one as described above. For example, it is possible to execute multiplication and division besides addition and subtraction. Alternatively, an increment/decrement value such as "+1", "+3", and "−1" is defined to allow the security suspiciousness Up/Down 703 and the weighting value to be integrated.

The value of the security suspiciousness calculated by the security suspiciousness verification section 13 is held in the RAM of the arithmetic section 10 for a predetermined time period, for example. Alternatively, the calculated security suspiciousness may be stored in the storage section 20. In this case, such value is associated with the log information 29 used for calculating the security suspiciousness, and the security suspiciousness is added to the log information 29 so that the security suspiciousness and the log information 29 are associated with each other, and stored in the storage section 20.

Returning back to the description referring to FIG. 2, in step 203, the security suspiciousness verification section 13 judges whether or not the security abnormality exists based on the security suspiciousness value calculated in step 202. In this case, the security suspiciousness verification section 13 verifies whether or not the security suspiciousness value exceeds the preset threshold value. If the security suspiciousness value exceeds the threshold value, it is judged that the security abnormality exists. The process then proceeds to step 204. If the security suspiciousness value does not exceed the threshold value, it is judged that the security abnormality does not exist. The process then proceeds to step 209.

In step 204, the safety abnormality verification section 14 verifies whether or not the safety abnormality exists based on the log information 29 acquired by the log information acquisition section 12 in step 201. The safety abnormality verification section 14 judges whether or not the safety abnormality exists from the log information 29 using the safety abnormality verification information 28 contained in the safety abnormality management information 25 stored in the storage section 20. If it is judged that the safety abnormality exists, the process proceeds to step 205. If it is judged that the safety abnormality does not exist, the process proceeds to step 207.

FIG. 8 is a view showing an example of a data structure of the safety abnormality verification information 28 used by the safety abnormality verification section 14 to verify the safety abnormality. The safety abnormality verification information 28 contains a safety abnormality ID 101 allocated to each record, and an abnormality content 102 indicating the content of the safety abnormality. The value set to the safety abnormality ID 101 corresponds to "0xA1" to "0xFF" to the safety abnormality among the ID numbers set to the abnormal state ID 602 of the log information 29 as shown in FIG. 6.

The abnormality content 102 stores the information indicating specific safety abnormality content. The safety abnormality content indicated by the information includes, for example, failure alert of device, bus-off state of device, power source loss, disconnection, change in automatic operation level, communication data noise, sensor abnormality and the like.

The safety abnormality verification section 14 compares the value of the abnormal state ID 602 of the log information 29 with the value of the safety abnormality ID 101 for each record of the safety abnormality verification information 28 so that it is verified whether or not the record having those values coincided exists in the safety abnormality verification information 28. If the record having the same value as the abnormal state ID 602 set to the safety abnormality ID 101 exists, it is judged that the safety abnormality has occurred. If the record does not exist, it is judged that the safety abnormality has not occurred.

Returning back to the description referring to FIG. 2, in step 205, the coping priority judgement section 15 judges on coping priority to determine which of the safety coping with the detected safety abnormality and the security coping with the detected security abnormality is executed in preference to the other. The coping priority judgement section 15 executes the process for judging the coping priority in accordance with the flowchart to be described later referring to FIG. 3.

In step 206, the coping priority judgement section 15 acquires the coping priority indicating the judgement result obtained in step 205, and the process proceeds to step 213.

In step 207, the traveling control influence degree calculation section 16 calculates the traveling control influence degree indicating the influence degree of the detected security abnormality on the vehicular traveling control. At this time, the traveling control influence degree calculation section 16 executes the process for traveling control influence degree calculation in accordance with the flowchart to be described later referring to FIG. 4.

In step 208, the traveling control influence degree calculation section 16 acquires the traveling control influence degree calculated in step 207, and the process proceeds to step 213.

In step 209, likewise the process in step 204 as described above, the safety abnormality verification section 14 verifies whether or not the safety abnormality exists using the safety abnormality verification information 28 based on the log information 29 acquired by the log information acquisition section 12 in step 201. If it is judged that the safety abnormality exists, the process proceeds to step 210. If it is judged that the safety abnormality does not exist, the process proceeds to step 212.

In step 210, the security function change judgement section 17 judges whether or not there is the security function to be changed upon execution of the safety coping with the detected safety abnormality. The security function change judgement section 17 executes the security function change judgement in accordance with the flowchart to be described later referring to FIG. 5.

In step 211, the security function change judgement section 17 acquires the security function change content indicating the judgement result obtained in step 210, and the process proceeds to step 213.

In step 212, the coping content determination section 18 judges the state as being normal having no communication data abnormality occurred, and the process proceeds to step 213.

In step 213, based on processing result obtained in either step 206, step 208, step 211, or step 212, the coping content determination section 18 determines the coping content to be executed. The coping content determination section 18 determines the coping content using a judgement table to be described later referring to FIG. 11.

When the coping content is determined in step 213, the coping content determination section 18 allows the communication section 11 to notify the ECUs 3, 4 of the determined coping content as necessary. In the case of the ECU that does not need execution of the specific coping, the coping content does not have to be notified. After executing step 213, the coping content determination section 18 terminates the process of the flowchart shown in FIG. 2. By executing the above-described steps, the vehicular control apparatus 1 monitors both the security abnormality and the safety abnormality in the onboard system. If the security abnormality and the safety abnormality occur, the primary coping content to be executed may be judged based on the abnormality occurrence condition and the characteristic information.

Figure 3:
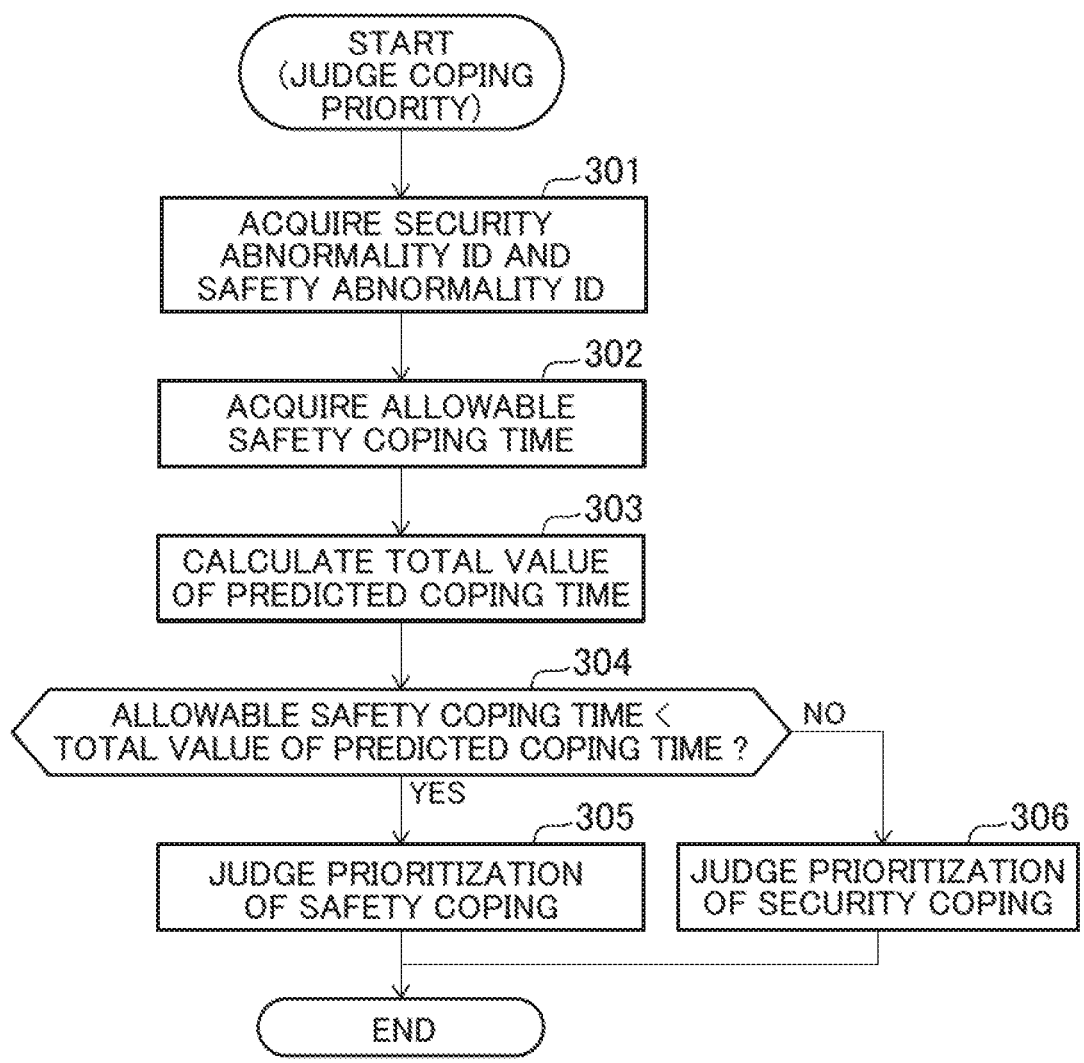
FIG. 3 is a flowchart representing a process flow of judgement on coping priority.

The coping priority judgement to be executed by the coping priority judgement section 15 in step 205 as shown in FIG. 2 will be described referring to the flowchart of FIG. 3. FIG. 3 represents the flowchart of a process flow of the coping priority judgement. The description will be made on the assumption that the respective steps are executed by the CPU of the arithmetic section 10.

In step 301, the coping priority judgement section 15 acquires IDs of the detected security abnormality and the detected safety abnormality, respectively. The coping priority judgement section 15 acquires values of the abnormal state ID 602 corresponding to the security abnormality and the safety abnormality, respectively from the log information 29 acquired by the log information acquisition section 12 in step 201 as shown in FIG. 2.

In step 302, the coping priority judgement section 15 acquires an allowable safety coping time to the detected safety abnormality. The coping priority judgement section 15 acquires the allowable time for the safety coping corresponding to the safety abnormality ID acquired in step 301 from the safety coping time information 26 contained in the safety abnormality management information 25 that is stored in the storage section 20.

In step 303, the coping priority judgement section 15 calculates a total value of the predicted coping time periods for the detected security abnormality and the detected safety abnormality. The coping priority judgement section 15 acquires the predicted time periods for the security coping and the safety coping corresponding to the security abnormality and the safety abnormality, respectively acquired in step 301 from the security coping time information 22 and the safety coping time information 26 contained in the security abnormality management information 21 and the safety coping time information 26, respectively, which are stored in the storage section 20. The acquired predicted time periods are summed to obtain the total value of the predicted coping time.

FIG. 9 shows examples of data structures of the security coping time information 22 and the safety coping time information 26, which are used by the coping priority judgement section 15 to acquire the allowable time and the predicted time for the safety coping. The security coping time information 22 as shown in FIG. 9(a) contains a security abnormality ID 801 allocated to each record, an allowable coping time 802 indicating the allowable time for the security coping, a security coping 803 indicating the security coping content, and a predicted coping time 804 indicating the predicted time required for executing the security coping. Values set to the security abnormality IDs 801 correspond to "0x01" to "0x9F" to the security abnormality among the ID numbers set to the abnormal state ID 602 of the log information 29 as shown in FIG. 6.

The security coping 803 stores the information indicating the content of the security coping to be executed to the security abnormality corresponding to the value of the security abnormality ID 801 of the record. The information indicating the security coping content may be stored in the storage section 20 as another file so that the information for specifying the corresponding file is set to the security coping 803.

The allowable coping time 802 and the predicted coping time 804 represent the respective limit conditions for executing the security coping with the security abnormality of the record. The allowable coping time 802 stores the value of the allowable time for executing the security coping that has been preliminarily set in the design stage based on the security specification required by the onboard system. It is possible to set the value of the allowable coping time 802 in consideration of the influence on the vehicular traveling control. Referring to the flowchart as shown in FIG. 3, the process using the allowable time for the security coping is not executed. Accordingly, the allowable coping time 802 does not have to be set to the security coping time information 22. For example, the predicted coping time 804 stores the value of the predicted time which has been preliminarily measured or calculated in the design stage for executing the security coping.

The safety coping time information 26 as shown in FIG. 9(*b*) contains a safety abnormality ID 805 allocated to each record, an allowable coping time 806 indicating the allowable time for the safety coping, a safety coping 807 indicating the safety coping content, and a predicted coping time 808 indicating the predicted time required for executing the safety coping. The value set to the safety abnormality ID 805 corresponds to "0xA1" to "0xFF" to the safety abnormality among the ID numbers set to the abnormal state ID 602 of the log information 29 as shown in FIG. 6.

The safety coping 807 stores the information indicating the safety coping content to be executed to the safety abnormality corresponding to the value of the safety abnormality ID 805 of the record. Likewise the security coping 803 of the security coping time information 22, the information indicating the safety coping content is stored in the storage section 20 as another file so that the information for specifying the corresponding file is set to the safety coping 807.

The allowable coping time 806 and the predicted coping time 808 represent the respective limit conditions for executing the safety coping with the safety abnormality of the record. For example, the allowable coping time 806 stores the value of the allowable time for executing the safety coping that has been preliminarily set in the design stage based on the safety specification required by the onboard system. It is possible to set the value of the allowable coping time 802 in consideration of the influence on the vehicular traveling control. For example, the predicted coping time 808 stores the value of the predicted time which has been preliminarily measured or calculated in the design stage for executing the safety coping.

In step 302 as shown in FIG. 3, the coping priority judgement section 15 compares the value of the safety abnormality ID acquired in step 301 with the value of the safety abnormality ID 805 of each record of the safety coping time information 26 as shown in FIG. 9(*b*) so that the record of the safety coping time information 26, having those values coincided with each other is specified. By acquiring the value of the allowable coping time 806 of the specified record, the allowable time for the safety coping with the detected safety abnormality is acquired. At this time, it is possible to calculate the allowable time for the available safety coping without influencing the vehicular traveling control by adjusting the allowable time for the acquired safety coping in accordance with the vehicle state and the peripheral environmental state. The vehicle state may be represented by the operation mode and the traveling state (travelling/stopped) of the vehicle, for example. The peripheral environmental state may be represented by weather, road condition, traveling location (highway/city area) and the like, for example. Specifically, if the vehicle is travelling in the rain, quick control is required. Accordingly, the allowable time for the safety coping is adjusted to be shorter than the value acquired from the safety coping time information 26. If the vehicle is stopped, the prompt control is not required. Accordingly, the allowable time for the safety coping is adjusted to be longer than the value acquired from the safety coping time information 26. It is possible to obtain the allowable time for the safety coping using an arbitrary method besides the one as described above.

In step 303 as shown in FIG. 3, the coping priority judgement section 15 compares the value of the security abnormality ID acquired in step 301 with the value of the security abnormality ID 801 of each record of the security coping time information 22 as shown in FIG. 9(*a*) so that the record of the security coping time information 22, having those values coincided with each other is specified. By acquiring the value of the predicted coping time 808 of the specified record, the predicted time for the safety coping with the detected safety abnormality is acquired. The value of the safety abnormality ID acquired in step 301 is compared with the value of the safety abnormality ID 805 of each record of the safety coping time information 26 as shown in FIG. 9(*b*) so that the record of the safety coping time information 26, having those values coincided with each other is specified. By acquiring the value of the predicted coping time 808 of the specified record, the predicted time for the safety coping with the detected safety abnormality is acquired. Thereafter, the predicted time for the acquired security coping and the predicted time for the safety coping are summed to obtain the total value of the predicted coping time.

Returning back to the description referring to FIG. 3, in step 304, the coping priority judgement section 15 compares the allowable time for the safety coping acquired in step 302 with the total value of the predicted coping time calculated in step 303. If the total value of the predicted coping time is larger than the allowable time for the safety coping, the process proceeds to step 305. Otherwise, that is, if the total value of the predicted coping time is equal to or smaller than the allowable time for the safety coping, the process proceeds to step 306.

In step 305, the coping priority judgement section 15 judges that execution of the safety coping is prioritized to execution of the security coping. The coping priority judgement section 15 refers to the security coping 803 and the safety coping 807 of the respective records of the security coping time information 22 and the safety coping time information 26 specified in step 303 to specify the respective coping contents. The priority of the specified safety coping is set higher than the priority of the security coping so that the respective priorities are held.

In step 306, similar to step 305, for example, the coping priority judgement section 15 judges that execution of the security coping is prioritized to execution of the safety coping. The coping priority judgement section 15 refers to the security coping 803 and the safety coping 807 of the respective records of the security coping time information 22 and the safety coping time information 26 specified in step 303 to specify the respective coping contents. The priority of the specified security coping is set to be higher than the priority of the safety coping, and the respective priorities are held.

After executing step 305 or 306, the coping priority judgement section 15 terminates the process of the flowchart shown in FIG. 3. In the process steps as described above, the vehicular control apparatus 1 allows the coping priority judgement section 15 to judge which of execution of the detected security abnormality and execution of the detected safety abnormality is prioritized.

Figure 4:
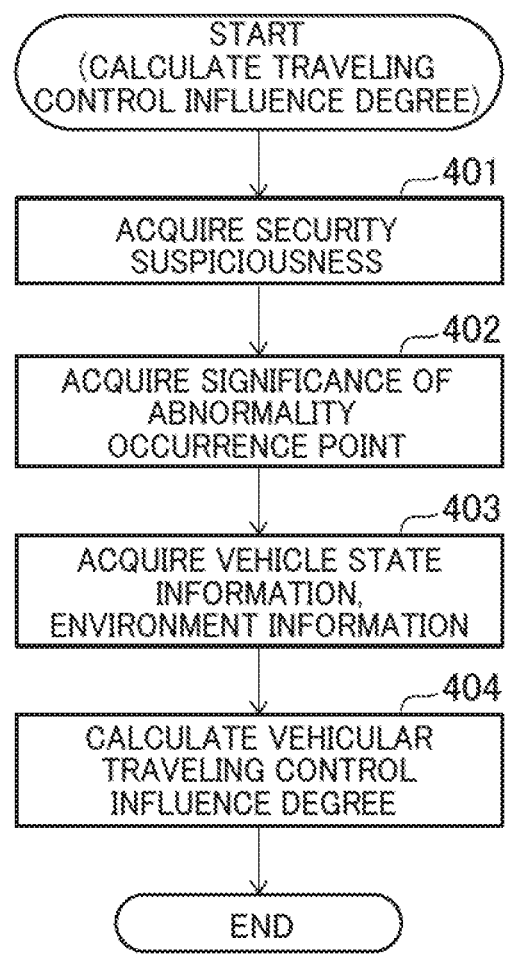
FIG. 4 is a flowchart representing a process flow of calculating traveling control influence degree.

The traveling control influence degree calculation to be executed by the traveling control influence degree calculation section 16 in step 207 as shown in FIG. 2 will be described referring to the flowchart as shown in FIG. 4. FIG. 4 is a flowchart representing the process flow for calculating the traveling control influence degree. The description will be made on the assumption that the respective steps are executed by the CPU of the arithmetic section 10.

In step 401, the traveling control influence degree calculation section 16 acquires the security suspiciousness calculated or acquired by the security suspiciousness verification section 13 in step 202 as shown in FIG. 2.

In step 402, the traveling control influence degree calculation section 16 acquires significance of the detected security abnormality occurrence location. The traveling control influence degree calculation section 16 acquires the significance corresponding to the detected security abnormality occurrence location from the significance information 23 contained in the security abnormality management information 21 that is stored in the storage section 20. As described above, the significance information 23 indicates the significance allocated to the ECUs 3 and 4, respectively. The traveling control influence degree calculation section 16 judges which of the ECU 3 and ECU 4 is the detected security abnormality occurrence location from the value of the abnormal state CAN ID 601 contained in the log information 29, and acquires the significance allocated to the judged ECU from the significance information 23.

The value converted based on, for example, ASIL (Automotive Safety Integrity Level) may be used for the significance information 23. The ASIL is well known as the safety method standard necessary for avoiding the unallowable risk, and evaluated in 5 grades including 4 required levels from ASIL D (most stringent) to ASIL A (least stringent), and QM (Quality Management) with no required level. For example, the significance may be expressed as the numerical value corresponding to any one of required levels in 5 grades specified as ASIL so that the numerical value is stored in the storage section 20 as the significance information 23. The ASIL request levels for the respective devices may be determined in three aspects, that is, Severity of hazard, Exposure, and Controllability. For example, the case where the failure of the device is fatal to the vehicular control, the case where there is the possibility of the situation to cause the failure of the device frequently, and the case where the failure of the device is unavoidable, the ASIL D is set to the device as the ASIL level. Basically, the ECU constituting the onboard system is designed to have the failsafe function to avoid the failure on the ground that the influence on the vehicular traveling control becomes higher as the ASIL level becomes higher.

The significance information 23 may be set using the index other than the ASIL as described above. For example, the significance information 23 may be set from the perspective that regards the device directly linked with the outside of the vehicle, the device for operating the actuator that influences the traveling control, the device for operating money handling application or the like as more important.

In step 403, the traveling control influence degree calculation section 16 acquires the vehicle state information indicating the vehicle state and the environment information indicating the peripheral environmental state. The vehicle state may be represented by the operation mode and the traveling state (traveling/stopped) of the vehicle, for example. The peripheral environmental state may be represented by weather, road condition, traveling location (highway/city area) or the like, for example. The traveling control influence degree calculation section 16 is capable of acquiring the vehicle state information and the environment information indicating the above-described states from the ECUs and various sensors in the onboard system, for example.

In step 404, based on the security suspiciousness acquired in step 401, the significance of the abnormality occurrence location acquired in step 402, and the vehicle state information and the environment information, which are acquired in step 403, the traveling control influence degree calculation section 16 calculates the degree of influence of the abnormality on the vehicular traveling control. The traveling control influence degree calculation section 16 calculates the traveling control influence degree E using the following formula (1). In the formula (1), I(i) that denotes the significance of each of the ECUs relating to the detected security abnormality is determined in accordance with the significance of the abnormality occurrence location acquired in step 402. The "i" denotes an identifier of each of the ECUs, having the value set in accordance with the number of the ECUs. The "W1" denotes an adjustment coefficient in accordance with the vehicle state and the peripheral environmental state, and the "S" denotes the security suspiciousness. The value of the W1 is determined based on the vehicle state information and the environment information, which have been acquired in step 403. The value of the S is determined based on the security suspiciousness acquired in step 401.

[Formula 1]

$$E = W1 * \sum_{i=1}^{n} (I(i) * S) \quad (1)$$

The above formula (1) is an example of the method of calculating the traveling control influence degree. Another method may be used for calculating the traveling control influence degree. The traveling control influence degree may be calculated without using the vehicle state information and the environment information or without using the significance of the abnormality occurrence location. Alternatively, the traveling control influence degree may be calculated without using the security suspiciousness. The traveling control influence degree calculation section 16 is capable of calculating the traveling control influence degree using at least one of the security suspiciousness, the significance of the abnormality occurrence location, and the vehicle state and environment information.

After calculating the traveling control influence degree in step 404, the traveling control influence degree calculation section 16 terminates the process of the flowchart shown in FIG. 4. In the above-described steps, the vehicular control apparatus 1 allows the traveling control influence degree calculation section 16 to calculate the degree of influence of the detected security abnormality on the vehicular traveling control.

Figure 5:
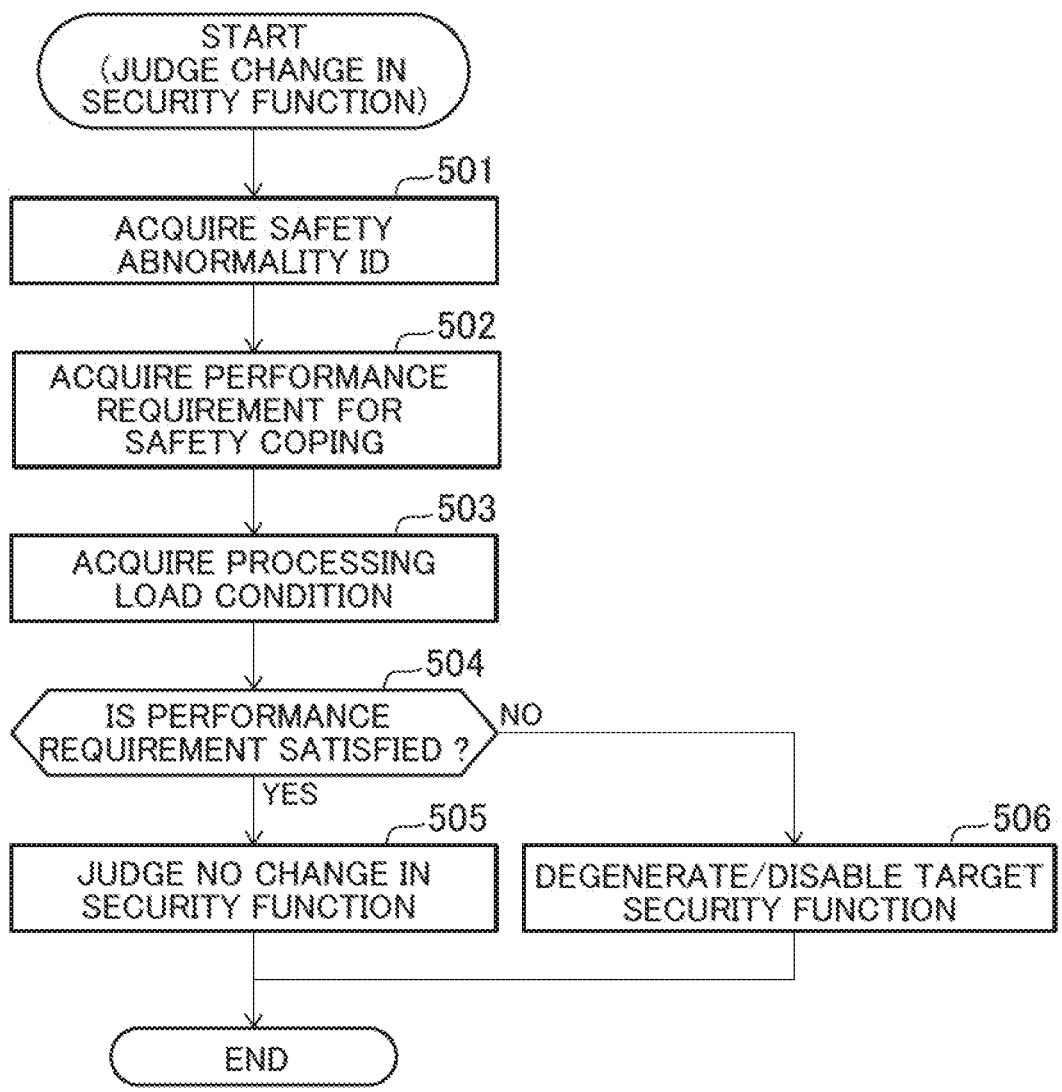
FIG. 5 is a flowchart representing a process flow of judgement on security function change.

Then referring to a flowchart of FIG. 5, an explanation will be made on the security function change judgement to be executed by the security function change judgement section 17 in step 210 as shown in FIG. 2. FIG. 5 is a flowchart representing a process flow of the security function change judgement. The description will be made on the assumption that the respective steps are executed by the CPU of the arithmetic section 10.

In step 501, the security function change judgement section 17 acquires the detected safety abnormality ID. The security function change judgement section 17 acquires the value of the abnormal state ID 602 corresponding to the safety abnormality from the log information 29 acquired by the log information acquisition section 12 in step 201 as shown in FIG. 2.

In step 502, the security function change judgement section 17 acquires the performance requirement for the safety coping with the detected safety abnormality. The security function change judgement section 17 acquires the performance requirement for the safety coping corresponding to the safety abnormality ID acquired in step 501 from the performance requirement information 27 contained in the safety abnormality management information 25 that is stored in the storage section 20.

FIG. 10 is a view showing an example of a data structure of the performance requirement information 27 used by the security function change judgement section 17 to acquire the performance requirement for the safety coping. The performance requirement information 27 shown in FIG. 10 contains a safety abnormality ID 901 allocated to each record, a safety coping 902 indicating the safety coping content, a performance requirement 903 indicating the required onboard system performance upon execution of the safety coping, a change object security function 904 indicating the security function to be changed when the onboard system performance fails to satisfy the requirement, and a coping related device 905 indicating the ECU relevant to the change in the security function. The value set to the safety abnormality ID 901 corresponds to the values "0xA1" to "0xFF" to the safety abnormality among the ID numbers set to the abnormal state ID 602 of the log information 29 as shown in FIG. 6.

In step 502 as shown in FIG. 5, the security function change judgement section 17 compares a value of the safety abnormality ID acquired in step 501 with the value of the safety abnormality ID 901 of each record of the performance requirement information 27 as shown in FIG. 10 so that the record of the performance requirement information 27, having those values coincided with each other is specified. By referring to the content of the performance requirement 903 in the specified record, judgement is made on the performance requirement for the safety coping with the detected safety abnormality. The judgement result is then acquired.

Returning back to the description referring to FIG. 5, in step 503, the security function change judgement section 17 acquires processing load conditions of the onboard system. The security function change judgement section 17 acquires various types of information representing the resource use condition in the onboard system as its processing load condition, for example, each CPU operation rate and each memory usage of the ECUs 3, 4 of the onboard system, usage of the communication bus 2, communication load, communication delay and the like. The processing load condition may be acquired by the security function change judgement section 17 periodically from the ECUs 3, 4, or may be intentionally acquired in accordance with the timing for executing step 503.

In step 504, the security function change judgement section 17 compares the performance requirement for the safety coping acquired in step 502 with the processing load condition acquired in step 503 as described above. If the processing load condition satisfies the performance requirement, the process proceeds to step 505. Otherwise, that is, if the processing load condition fails to satisfy the performance requirement, the process proceeds to step 506.

In step 505, the security function change judgement section 17 judges that there is no change in the security function.

In step 506, the security function change judgement section 17 judges that the security function has been changed, and that the security function corresponding to the detected safety abnormality has to be degenerated or disabled. The security function change judgement section 17 then refers to the content of the security function 904 to be changed in the record of the performance requirement information 27 specified in step 502 as described above. The judgement is made on the security function to be degenerated or disabled to the detected safety abnormality. The judgement result is then acquired.

After executing step 505 or 506, the security function change judgement section 17 terminates the process of the flowchart shown in FIG. 5. In the above-described steps, the vehicular control apparatus 1 allows the security function change judgement section 17 to judge whether there exists the security function to be changed upon detection of the safety abnormality, and as to which the security function is to be changed.

Then referring to the judgement table shown in FIG. 11, an explanation will be made on the method of determining the coping content to be performed by the coping content determination section 18 in step 213 as shown in FIG. 2. FIG. 11 is an example of the judgement table used by the coping content determination section 18 to determine the coping content.

If the coping priority judgement section 15 judges the coping priority in step 205 as shown in FIG. 2, the coping content determination section 18 determines the coping content in accordance with judgement fields 111, 112 of FIG. 11. In this case, based on the judgement result obtained in step 304 as shown in FIG. 3, the coping content determination section 18 judges which of the judgement fields 111 and 112 is to be followed. That is, if the total value of the predicted coping time is equal to or smaller than the allowable safety coping time for the safety coping in step 304, and it is judged that execution of the security coping is prioritized in step 306, the coping content determination section 18 determines the coping content in accordance with the judgement field 111. In this case, the coping content determination section 18 executes the security coping corresponding to the security abnormality indicated by the abnormal state ID 602 of the log information 29, and then determines execution of the safety coping corresponding to the safety abnormality indicated by the abnormal state ID 602. Meanwhile, if it is judged that the total value of the predicted coping time is larger than the allowable time for the safety coping in step 304, and if it is judged that execution of the safety coping is prioritized in step 305, the coping content determination section 18 determines the coping content in accordance with the judgement field 112. In this case, the coping content determination section 18 executes the safety coping to cope with the safety abnormality indicated by the abnormal state ID 602 of the log information 29, and then it is determined to execute the security coping corresponding to the security abnormality indicated by the abnormal state ID 602. One of the security coping and the safety coping whichever the execution priority is higher within the allowable coping time is executed. Then existence of the abnormality occurrence is monitored for a predetermined monitor time. If the abnormality no longer occurs, execution of the other coping may be omitted.

If the traveling control influence degree calculation section 16 calculates the traveling control influence degree in step 207 as shown in FIG. 2, for example, the coping content determination section 18 determines the coping content in accordance with judgement fields 113, 114 of FIG. 11. In this case, based on the value of the traveling control influence degree calculated by the traveling control influence degree calculation section 16, the coping content determination section 18 judges which of the judgement fields 113 and 114 is to be followed. For example, assuming that the value of the traveling control influence degree is set to D, the value D is compared with preset threshold values Th1, Th2 (Th1<Th2). The judgement is made on the coping content in accordance with the comparison result. That is, in the case of 0<D≤Th1, the coping content determination section 18 determines the coping content in accordance with the judgement field 113. In this case, the coping content determination section 18 determines to "maintain and collect the log" as the security coping, for example. In the case of Th1<D≤Th2, the coping content determination section 18 determines the coping content in accordance with the judgement field 113. In this case, the coping content determination section 18 determines to "stop routing and upload the log to the center" as another security coping besides the one as described above, for example. Meanwhile, in the case of Th2<D, the coping content determination section 18 determines the coping content in accordance with the judgement field 114. In this case, the coping content determination section 18 determines to execute the safety coping in addition to the security coping. For example, the "prevention of attack propagation" is executed as the security coping, and "degeneration operation" is executed as the safety coping.

If the security function change judgement section 17 judges the security function change in step 210 as shown in FIG. 2, the coping content determination section 18 determines the coping content in accordance with judgement fields 115, 116 of FIG. 11. In this case, based on the judgement result in step 504 as shown in FIG. 5, the coping content determination section 18 judges which of the judgement fields 115 and 116 is to be followed. That is, if it is judged that the processing load condition satisfies the performance requirement in step 504, and if it is judged that there is no security function change in step 505, the coping content determination section 18 determines the coping content in accordance with the judgement field 115. In this case, the coping content determination section 18 determines to execute the safety coping with the safety abnormality indicated by the abnormal state ID 602 in the log information 29. Meanwhile, if it is judged that the processing load condition fails to satisfy the performance requirement in step 504, and that there is the security function change in step 506, the coping content determination section 18 determines the coping content in accordance with the judgement field 116. In this case, the coping content determination section 18 executes the safety coping corresponding to the safety abnormality indicated by the abnormal state ID 602 in the log information 29, and degenerates or disables the security function judged in step 506 so that a part of the security function in the onboard system is changed.

If it is judged as the normal state in step 212 as shown in FIG. 2, the coping content determination section 18 determines the coping content in accordance with a judgement field 117 as shown in FIG. 11. In this case, the coping content determination section 18 does not execute the security coping nor the safety coping, and determines to continuously monitor whether or not the communication data abnormality exists in the onboard system.

The vehicular control apparatus 1 of the above-described embodiment is configured to execute appropriate coping in consideration of cases that the safety abnormality and/or the security abnormality may occur in the traveling vehicle. The vehicular control apparatus 1 in the automobile designed based on safety first policy is capable of preventing delay in the safety coping owing to contention of the limited resource in the onboard system. It is also possible to prevent deterioration in availability of vehicle traveling owing to excessive transition to the safety coping upon occurrence of the security abnormality. Accordingly, the availability of the vehicle traveling may be maintained at low costs while securing safety of the vehicle.

The following effects are derived from the embodiment of the present invention as described above.

(1) The vehicular control apparatus 1 is used in the onboard system provided with the ECUs 3, 4 mutually connected via the communication bus. The vehicular control apparatus 1 includes the storage section 20 for storing information, and the arithmetic section 10 for executing the process based on the information stored in the storage section 20. The information stored in the storage section 20 contains the security abnormality management information 21 relating to the security abnormality as the communication data abnormality owing to the security attack from the outside of the onboard system, and the safety abnormality management information 25 relating to the safety abnormality as the communication data abnormality owing to the abnormality in the onboard system. The security abnormality management information 21 contains the security coping time information 22 indicating the limit condition for executing the security coping with the security abnormality. The safety abnormality management information 25 contains the safety coping time information 26 indicating the limit condition for executing the safety coping with the safety abnormality. If the communication data abnormality in the onboard system is detected, the arithmetic section 10 allows the coping content determination section 18 to determine the coping content to the detected communication data abnormality based on the security abnormality management information 21 and the safety abnormality management information 25. It is possible to provide the onboard system which appropriately copes with both the security abnormality and the safety abnormality.

(2) The limit condition of the security coping time information 22 contains the predicted coping time 804 indicating the time required for executing the security coping. The limit condition of the safety coping time information 26 contains the allowable coping time 806 indicating the time to be allowed when executing the safety coping, and the predicted coping time 808 indicating the time required for executing the safety coping. If both the security abnormality and the safety abnormality are detected, the arithmetic section 10 determines the coping content based on the predicted coping time 804, the allowable coping time 806, and the predicted coping time 808. That is, the arithmetic section 10 allows the coping priority judgement section 15 to obtain the total value of the predicted coping times 804 and 808 (step 303), and allows the coping content determination section 18 to determine the coping content based on a result of comparison between the total value and the allowable coping time 806 (steps 304 to 306, step 213). Specifically, the arithmetic section 10 allows the coping priority judgement section 15 and the coping content determination section 18 to determine the coping content in step 213 so that execution of the safety coping is prioritized if the total value is larger than the allowable coping time 806 (step 305), and execution of the security coping is prioritized if the total value is equal to or smaller than the allowable coping time 806 (step 306). If both the security abnormality and the safety abnormality occur, it is judged which of execution of coping with the abnormality is prioritized to determine the coping content.

(3) The security abnormality management information 21 contains the significance information 23 indicating each significance of the ECUs 3, 4 as the limit condition for executing the security coping. If the security abnormality is detected, based on the significance of either the ECU 3 or 4 corresponding to the location where the security abnormality has occurred, the arithmetic section 10 calculates the influence degree on the vehicular traveling control (step 207), and allows the coping content determination section 18 to determine the coping content based on the calculated influence degree (step 213). It is possible to appropriately determine the coping content in consideration of the influence degree on the vehicular traveling control upon occurrence of the security abnormality.

(4) The arithmetic section 10 allows the security suspiciousness verification section 13 to calculate the security suspiciousness indicating suspiciousness to the security abnormality, or acquire the security suspiciousness from the ECUs 3, 4 (step 202), and allows the traveling control influence degree calculation section 16 to calculate the influence degree on the vehicular traveling control based on the security suspiciousness calculated or acquired by the security suspiciousness verification section 13, and the significance of the ECU corresponding to the security abnormality occurrence location indicated by the significance information 23 (steps 401, 402, 404). It is therefore possible to accurately calculate the influence degree to the vehicular traveling control in consideration of the security abnormality occurrence condition, and significance of the ECU influenced by the security abnormality occurrence.

(5) The arithmetic section 10 judges whether or not the security abnormality exists based on the security suspiciousness calculated or acquired by the security suspiciousness verification section 13 (step 203). It is possible to accurately judge whether or not the security abnormality exists.

(6) The arithmetic section 10 allows the traveling control influence degree calculation section 16 to acquire the vehicle state information indicating the operation mode or the traveling state of the vehicle, and the environment information indicating the peripheral environment of the vehicle (step 403), and calculates the influence degree on the vehicular traveling control based on the acquired vehicle state information and the environment information, and the significance of the ECU corresponding to the security abnormality occurrence location indicated by the significance information 23 (step 404). It is possible to accurately calculate the influence degree to the vehicular traveling control in consideration of the conditions of the vehicle upon occurrence of the security abnormality such as the operation mode, the traveling state, and the peripheral environment, and the significance of the ECU influenced by the security abnormality occurrence.

(7) The safety abnormality management information 25 contains the performance requirement information 27 indicating the performance of the onboard system required for the safety coping as the limit condition for executing the safety coping. Upon detection of the safety abnormality, the arithmetic section 10 allows the security function change judgement section 17 to acquire the processing load condition of the onboard system (step 503). Based on the result of comparison between the acquired processing load condition and the performance requirement information 27, the coping content determination section 18 determines the coping content (steps 504 to 506, step 213). Specifically, the arithmetic section 10 determines the coping content in step 213 so that the security function change judgement section 17 and the coping content determination section 18 degenerate or disable a part of the security function of the onboard system if the processing load condition fails to satisfy the performance requirement 903 of the performance requirement information 27 (step 506). It is possible to appropriately determine the coping content in consideration of the processing load condition and the performance requirement of the onboard system upon occurrence of the safety abnormality.

In an exemplified case of the embodiment, upon detection of both the security abnormality and the safety abnormality, it is judged on the coping priority in step 205, and the coping content is determined in step 213 as shown in the flowchart of FIG. 2. The present invention, however, is not limited to the case as described above. For example, it is possible to judge the coping priority in step 205, and then to calculate the traveling control influence degree in step 207, or to judge the security function change in step 210. If it is judged to prioritize execution of the security coping in step 205, the traveling control influence degree may be calculated in step 207. If it is judged to prioritize execution of the safety coping in step 205, judgement may be made on the security function change in step 210.

In an exemplified case of the embodiment, another vehicular control apparatus 1 besides the ECUs 3, 4 is used to determine the coping content upon occurrence of the security abnormality and the safety abnormality. The present invention, however, is not limited to the case as described above. For example, each of the ECUs 3, 4 may be configured to execute the above-described process to determine the coping content individually. It is possible to connect the information processor, for example, the smartphone as the vehicular control apparatus 1 to the onboard system. It is also possible to use the information processor disposed outside the vehicle as the vehicular control apparatus 1.

As the embodiments and various modifications are exemplified cases, the present invention is not limited to the contents of those described above so long as its characteristics are not impaired. The present invention is not limited to the contents of various embodiments and modifications as described above. Other embodiments may be contained in the present invention so long as they are regarded to be within the scope of the technical idea of the present invention.

The present application claims priority from Japanese patent application JP2017-199331 filed on Oct. 13, 2017, the disclosed content of which is hereby incorporated by reference into this application.

LIST OF REFERENCE SIGNS

1: vehicular control apparatus,
2: communication bus,
3: ECU,
4: ECU,
10: arithmetic section, 11: communication section,
12: log information acquisition section,
13: security suspiciousness verification section,
14: safety abnormality verification section,
15: coping priority judgement section,
16: traveling control influence degree calculation section,
17: security function change judgement section,
18: coping content determination section,
20: storage section,
21: security abnormality management information,
22: security coping time information,
23: significance information,
24: suspiciousness calculation information,
25: safety abnormality management information,
26: safety coping time information,
27: performance requirement information,
28: safety abnormality verification information,
29: log information

The invention claimed is:

1. A vehicular control apparatus used in an onboard system having a plurality of information processors mutually connected via a communication bus, comprising:
a storage section for storing information; and
an arithmetic section for executing a process based on the information stored in the storage section, wherein:
the information contains first management information relating to a security abnormality as a communication data abnormality owing to security attack from outside the onboard system, and second management information relating to a safety abnormality as a communication data abnormality owing to an abnormality in the onboard system;
the first management information contains first limit condition information indicating a first limit condition for executing a security coping with the security abnormality;
the second management information contains second limit condition information indicating a second limit condition for executing a safety coping with the safety abnormality; and
if the communication data abnormality in the onboard system is detected, the arithmetic section determines a coping content to the detected communication data abnormality based on the first management information and the second management information,
wherein:
the first limit condition includes a first time required for executing the security coping;
the second limit condition includes a second time which is allowed when executing the safety coping, and a third time required for executing the safety coping; and
if both the security abnormality and the safety abnormality are detected, the arithmetic section determines the coping content based on the first time, the second time, and the third time.

2. The vehicular control apparatus according to claim 1, wherein the arithmetic section obtains a total value of the first time and the third time, and determines the coping content based on a result of comparison between the total value and the second time.

3. The vehicular control apparatus according to claim 2, wherein the arithmetic section determines the coping content to prioritize execution of the safety coping if the total value is larger than the second time, and to prioritize execution of the security coping if the total value is equal to or smaller than the second time.

4. A vehicular control apparatus used in an onboard system having a plurality of information processors mutually connected via a communication bus, comprising:
a storage section for storing information; and
an arithmetic section for executing a process based on the information stored in the storage section, wherein:
the information contains first management information relating to a security abnormality as a communication data abnormality owing to security attack from outside the onboard system, and second management information relating to a safety abnormality as a communication data abnormality owing to an abnormality in the onboard system;
the first management information contains first limit condition information indicating a first limit condition for executing a security coping with the security abnormality;
the second management information contains second limit condition information indicating a second limit condition for executing a safety coping with the safety abnormality; and
if the communication data abnormality in the onboard system is detected, the arithmetic section determines a coping content to the detected communication data abnormality based on the first management information and the second management information,
wherein:
the first limit condition includes a significance corresponding to each of the plurality of information processors; and
if the security abnormality is detected, based on the significance of the information processor corresponding to a location where the security abnormality has occurred among the plurality of information processors, the arithmetic section calculates an influence degree on a vehicular traveling control, and determines the coping content based on the calculated influence degree.

5. The vehicular control apparatus according to claim 4, wherein the arithmetic section calculates a security suspiciousness indicating suspiciousness to the security abnormality, or acquires the security suspiciousness from the information processor, and calculates the influence degree based on the calculated or acquired security suspiciousness and the significance.

6. The vehicular control apparatus according to claim 5, wherein the arithmetic section judges whether or not the security abnormality exists based on the security suspiciousness.

7. The vehicular control apparatus according to claim 4, wherein the arithmetic section acquires vehicle state information indicating an operation mode or a traveling state of the vehicle, and calculates the influence degree based on the acquired vehicle state information and the significance.

8. The vehicular control apparatus according to claim 4, wherein the arithmetic section acquires environment information indicating a peripheral environment of the vehicle, and calculates the influence degree based on the acquired environment information and the significance.

9. A vehicular control apparatus used in an onboard system having a plurality of information processors mutually connected via a communication bus, comprising:
a storage section for storing information; and
an arithmetic section for executing a process based on the information stored in the storage section, wherein:
the information contains first management information relating to a security abnormality as a communication data abnormality owing to security attack from outside the onboard system, and second management information relating to a safety abnormality as a communication data abnormality owing to an abnormality in the onboard system;

the first management information contains first limit condition information indicating a first limit condition for executing a security coping with the security abnormality;

the second management information contains second limit condition information indicating a second limit condition for executing a safety coping with the safety abnormality; and if the communication data abnormality in the onboard system is detected, the arithmetic section determines a coping content to the detected communication data abnormality based on the first management information and the second management information, wherein:

the second limit condition includes a performance requirement indicating a performance of the onboard system required for the safety coping; and the arithmetic section acquires a processing load condition of the onboard system if the safety abnormality is detected, and determines the coping content based on a result of comparison between the acquired processing load condition and the performance requirement.

10. The vehicular control apparatus according to claim 9, wherein the arithmetic section determines the coping content to degenerate or disable a part of a security function of the onboard system if the processing load condition does not satisfy the performance requirement.

* * * * *